United States Patent
Wodara et al.

(10) Patent No.: US 9,309,977 B2
(45) Date of Patent: Apr. 12, 2016

(54) MANIFOLD OF A VALVE CONDUCTING GAS OR A LIQUID AND SHUTTLE VALVE

(71) Applicant: Phönix Armaturen-Werke Bregel GmbH, Volkmarsen (DE)

(72) Inventors: Gunter Wodara, Bad Arolsen (DE); Hannes Kellermann, Kassel (DE)

(73) Assignee: Phönix Armaturen-Werke Bregel GmbH, Volkmarsen (DE)

( * ) Notice: Subject to any disclaimer, the term of this patent is extended or adjusted under 35 U.S.C. 154(b) by 167 days.

(21) Appl. No.: 13/955,804

(22) Filed: Jul. 31, 2013

(65) Prior Publication Data
US 2014/0034167 A1 Feb. 6, 2014

(30) Foreign Application Priority Data
Aug. 2, 2012 (EP) .................... 12005610

(51) Int. Cl.
*F16K 11/065* (2006.01)
*F16K 11/044* (2006.01)
*F16K 27/02* (2006.01)
*F16L 43/00* (2006.01)

(52) U.S. Cl.
CPC ............. *F16K 11/065* (2013.01); *F16K 11/044* (2013.01); *F16K 27/0263* (2013.01); *F16L 43/002* (2013.01); *Y10T 137/86493* (2015.04); *Y10T 137/86879* (2015.04)

(58) Field of Classification Search
CPC . F16K 11/065; F16K 11/044; F16K 27/0263; F16K 27/041; F16L 43/002; Y10T 137/86493; Y10T 137/86879
USPC ............... 137/872; 138/39, 44, 177, DIG. 11; 285/148.22
See application file for complete search history.

(56) References Cited

U.S. PATENT DOCUMENTS

| 2,056,782 | A | | 10/1936 | Fosdick |
| 2,303,949 | A | | 12/1942 | Nordell |
| 3,874,825 | A | * | 4/1975 | Jentsch .......................... 417/519 |
| 4,190,082 | A | * | 2/1980 | Hernandez Crespo ....... 137/872 |
| 4,744,695 | A | * | 5/1988 | Lindsey et al. .............. 138/177 |
| 5,054,819 | A | | 10/1991 | Grunwald |

FOREIGN PATENT DOCUMENTS

| DE | 598919 C | 6/1934 |
| WO | WO-02/10628 A1 | 2/2002 |

* cited by examiner

Primary Examiner — Michael R Reid
(74) Attorney, Agent, or Firm — Dinsmore & Shohl, LLP; Douglas L. Wathen

(57) ABSTRACT

A manifold of a valve conducting gas or liquid has a passage with an inlet and at least one outlet. The passage changes direction from the manifold inlet to the manifold outlet over a length of the passage. The cross-section of the manifold in the region where the passage changes direction, merges in a plurality of sequential sectors from an almost round or oval cross-section over a plurality of cross-sections that are flattened on the inner manifold side again into an almost round or oval cross-section. In the region of the flattened cross-section of the passage, the cross-sectional contour has a plurality of arcuate sections that are continuous with one another.

12 Claims, 3 Drawing Sheets

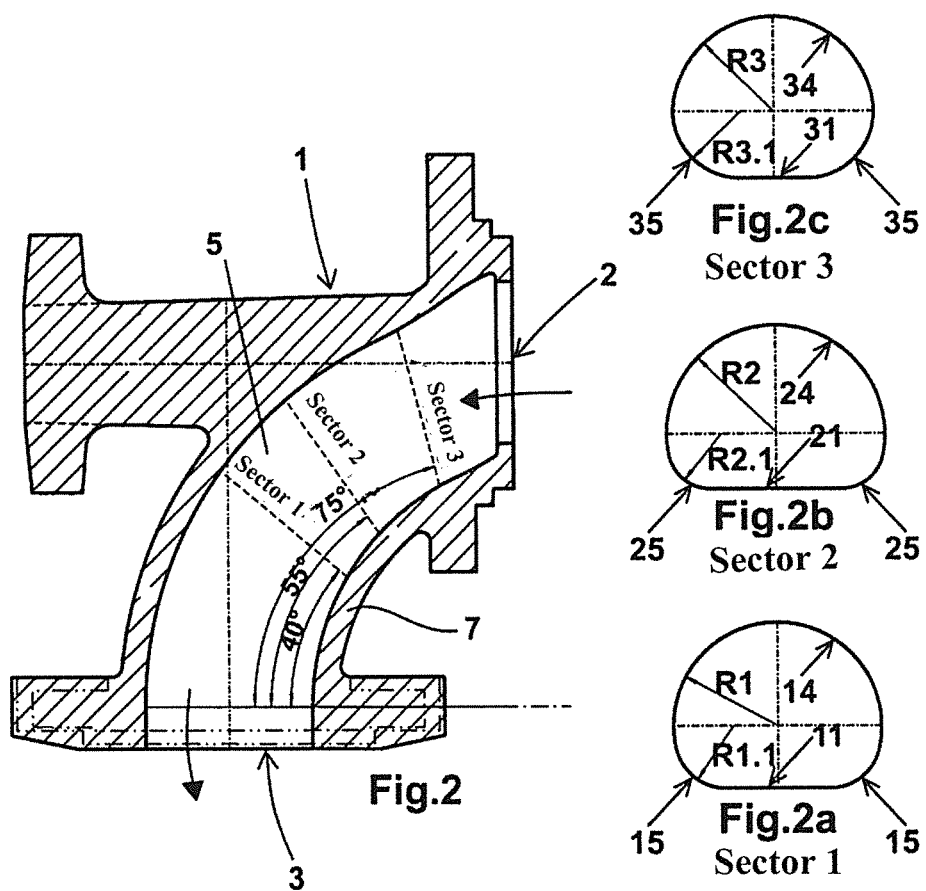

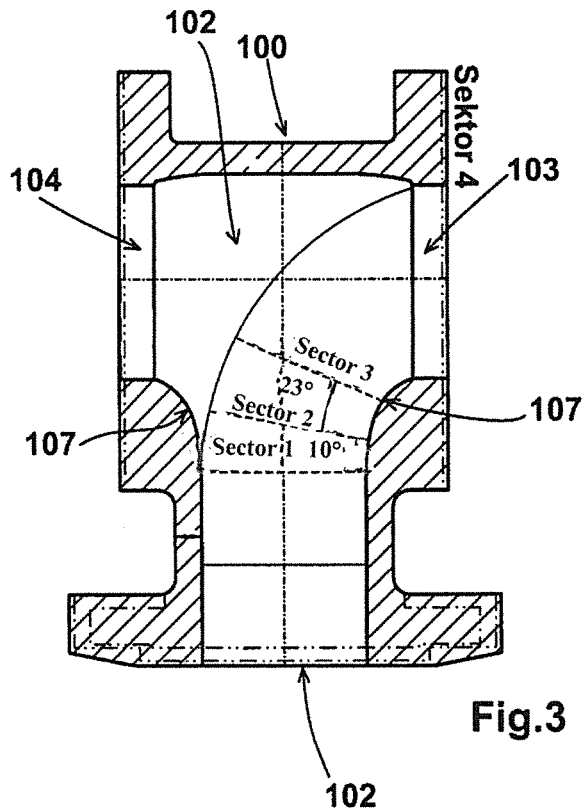
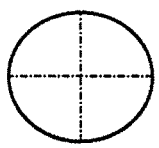
Sector 1
Fig.3a
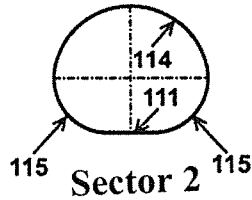
Sector 2
Fig.3b
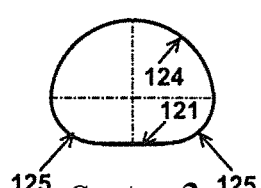
Sector 3
Fig.3c
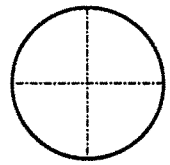
Section 4
Fig.3d

MANIFOLD OF A VALVE CONDUCTING GAS OR A LIQUID AND SHUTTLE VALVE

CROSS REFERENCE TO RELATED APPLICATION

This U.S. national phase application claims priority from EP patent application Serial No. 12 005 610.6-1252, filed Aug. 2, 2012, the entire content of which is incorporated herein in its entirety.

FIELD OF THE INVENTION

The invention relates to a manifold of a valve conducting gas or liquid, wherein the manifold has a passage having an inlet and at least one outlet, wherein the passage changes direction from the manifold outlet to the manifold inlet over a length of the passage. The invention also relates to a shuttle valve.

BACKGROUND OF THE INVENTION

Manifolds, in particular for shuttle valves, have long been known from the prior art. Shuttle valves are valves which have an inlet flange and two outlet flanges, wherein the passage to either the one or the other outlet is opened by a slider. A respective safety valve is arranged on the outlet flanges. The shuttle valves are made up of an inlet manifold and two outlet manifolds, on whose outlet flanges a respective safety valve is located. With the outlet manifold, the shuttle valve is seated on the pipe which conducts the medium. Safety valves are configured such that in the event of excess pressure they provide that the medium can be blown off to reduce the pressure, but that the medium in the majority of all cases is returned into the system again in order, particularly with toxic gases, to prevent such gases entering into the environment.

In the prior art, the manifold of such a shuttle valve is overdimensioned to keep flow losses small. The reason for this can be found in the fact that, in the event of flow losses which are too large, the corresponding safety valve associated with the shuttle valve may no longer respond. Large manifold housings, however, mean an increased use of material, with such a shuttle valve already being very expensive, particularly when the manifolds are manufactured from stainless steel.

SUMMARY OF THE INVENTION

The underlying object of the invention is to minimize the flow losses in the region of the manifold to save material by a smaller dimensioning of the manifold.

In accordance with the present invention, it is proposed that the cross-section of the manifold, in the region where the manifold changes direction, the manifold merges in a plurality of sequential sectors from an almost round or oval cross-section, through a plurality of cross-sections that are flattened on the inner manifold side, and again into an almost round or oval cross-section. In the region of the flattened cross-section of the passage, the cross-sectional contour has a plurality of arcuate sections that are continuous with one another. In a prior art manifold the respective cross-section is always of a different size over the length of the passage of the manifold, and is in particular smaller toward the center of the passage. This has the consequence of the previously mentioned flow losses. Since now the cross-sections of the passage of the manifold are flattened on the inner manifold side, a cross-section in the manner of a "bread roll" arises for the individual cross-sectional sectors. The cross-sectional contour describes an area which is substantially the same in each of the sectors where the passage changes direction. If now substantially no cross-section reductions occur over the length of the passage then not even slight flow losses occur.

Provision is thus in particular made that the radius of the one first arcuate section, which is opposite the flattened portion, is proportional to the length of the flattened portion. This means that the shorter the flattened portion is, the smaller the radius of the first arcuate section is which is opposite the flattened portion. Provision is made in accordance with a further feature of the invention that the radius of the two arcuate sections are inversely proportional to the length of the flattened portion in the transition from the flattened portion to the first arcuate section. The contour of the cross-section of the passage at the different sectors can thus not only be described by the flattened portion and the first arcuate section opposite the flattened portion, but the cross-sectional shape or the contour of the cross-section can rather be specified in more detail in that the radius of the two second arcuate sections is inversely proportional to the length of the flattened portion in the transition from the flattened portion to the first arcuate section. This means that as the length of the flattened portion increases, the lateral radius in the transition from the flattened portion to the first arcuate section (the radius adjoining the flattened portion) becomes smaller and smaller.

It has already been pointed out that the cross-section remains substantially equal over the length of the passage, actually due to the specific configuration of the contour of the cross-section, as has previously been described.

Furthermore, provision is made in accordance with a first embodiment of a manifold that the change in direction of the passage of the manifold from the inlet to the outlet amounts to between 60 degrees and 90 degrees. It must be taken into account in this respect that the change in direction from a single inlet to a single outlet does not extend at an angle of 90 degrees or almost at an angle of 90 degrees between the inlet and the outlet, but the angle is rather smaller and preferably lies between 60 degrees and 90 degrees, but is in particular at 75 degrees.

In a second embodiment in which the manifold has two mutually opposite outlets, the angle from the inlet to each of the two outlets amounts to approximately 90 degrees.

The subject of the advantage is likewise a shuttle valve. The shuttle valve comprises three manifolds, namely an inlet manifold having an inlet flange for attachment to a pipe, for example, as well as two outlet flanges each for receiving one outlet manifold. Each outlet manifold in turn comprises an inlet flange and an outlet flange, with the outlet flange of the inlet manifold connected to the inlet flange of the outlet manifold. A safety valve is located at the connection flange of the respective outlet manifold. The shuttle valve has a Y-shaped design and has a slider to allow the passage to the one or the other safety valve.

BRIEF DESCRIPTION OF THE DRAWINGS

The invention will be described in more detail below with reference to the drawings.

FIG. 2 is a cross-sectional view of the outlet manifold, with one inlet and one outlet being provided;

FIGS. 2a to 2c are cross-sectional views of the leadthrough in different sectors;

FIG. 3 is a cross-sectional view of the inlet manifold with an inlet and two outlets; and FIGS. 3a to 3d are cross-sectional views of the leadthrough in different sectors.

DETAILED DESCRIPTION OF THE INVENTION

Figure 1:
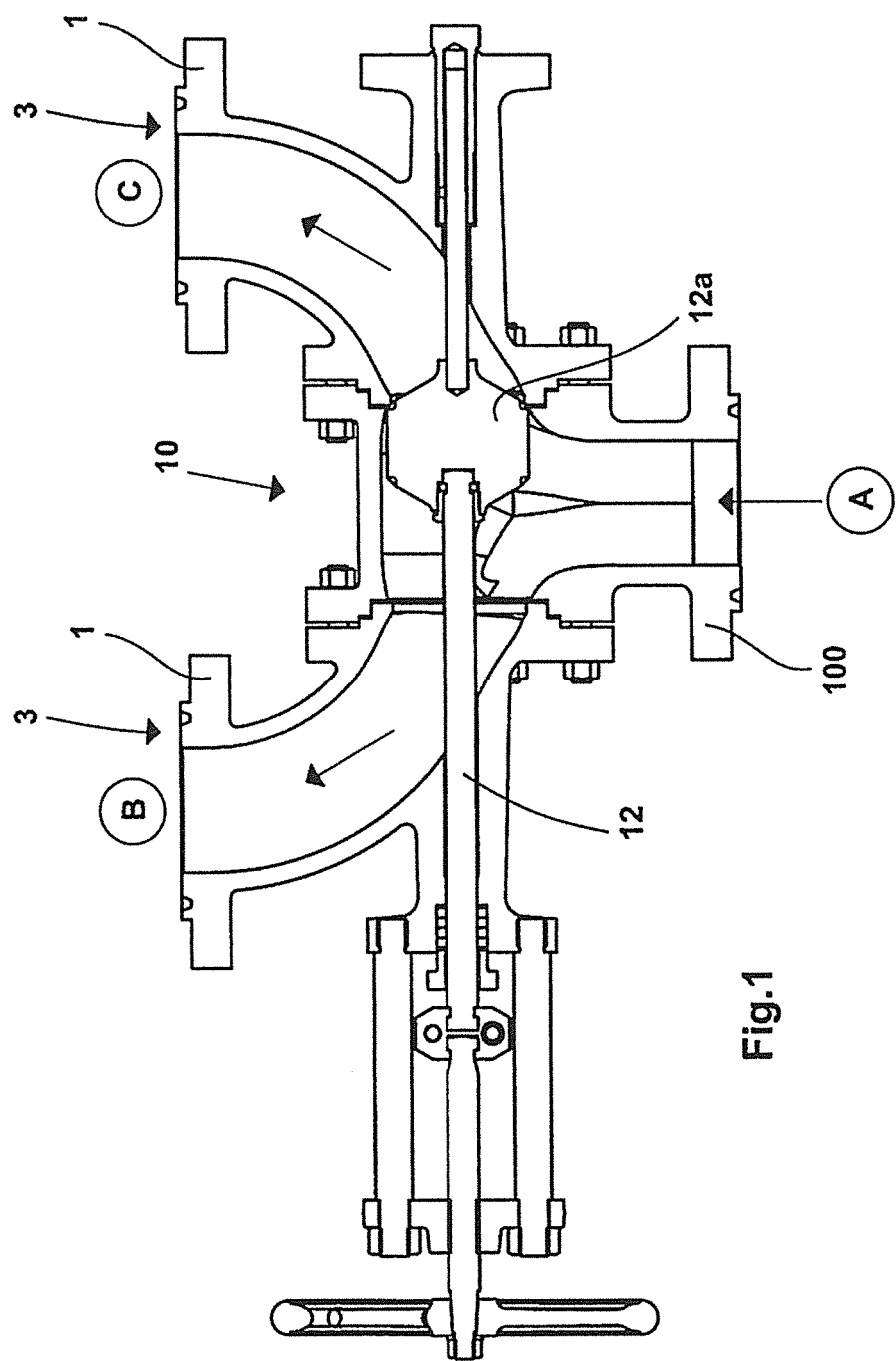
FIG. 1 is a cross-sectional view of a shuttle valve having two outlet manifolds and one inlet manifold.

FIG. 1 shows the shuttle valve 10, with the shuttle valve 10 being composed of two outlet manifolds 1 which are in communication with one another through an inlet manifold 100. The shape of the shuttle valve is approximately Y-shaped in the view. The shuttle valves 10 furthermore has a slider 12 having a cut-off member 12a, whereby either outlet manifold 1 can be alternately brought into communication with the inlet manifold 100 in a medium-conducting manner. A respective safety valve, which is not shown, is located on the outlet 3 of each outlet manifold 1.

The outlet manifold 1 is also shown in FIG. 2. The outlet manifold 1 has an inlet 2 and the outlet 3, each having a corresponding flange. Between the inlet and the outlet, the manifold has the passage which is designated by 5 and which has an inner wall 7. In the region of the inlet 2, the passage has a substantially round or oval cross-section; the passage has the same cross-section in the region of the outlet 3. The passage 5 is divided into three sectors for the explanation of the invention, with the first sector being located at an angle of around 40 degrees to the outlet; the second sector being located at an angle of 55 degrees and the third sector being located at an angle of 75 degrees to the outlet. FIGS. 2a to 2c show the respective cross-sectional contour of the corresponding sectors. The contour of the passage 5 in the first sector 1 can thus be recognized at a spacing of 40 degrees from the outlet 3 in FIG. 2a. The contour has the flattened portion 11 in the region of the inner wall 7 of the passage, with a first arcuate section 14 having a radius R1 disposed opposite the flattened portion 11. The first arcuate section is as semicircular and has a respective further second arcuate section 15 in the transition to the flat section 11 at both sides of the flattened portion 11. The second arcuate sections 15 each have a radius R1.1 which is substantially smaller than the radius R1 of the first semicircular section 14.

Referring to FIG. 2b, the contour of the leadthrough passage in the second sector 2, at a spacing of 55 degrees from the outlet 3, is shown. A first arcuate section 24 above a flattened portion 21, with the flattened portion being substantially longer than the flattened portion 11 in the first sector 1. The first arcuate section 24, which is of a semicircular design, also merges at both sides through two arcuate second sections 25 into the flattened portion 21, with the radius R2 of the first arcuate section 24 being larger than the radius R1, but with the radius R2.1 being smaller than the radius R1.1 in FIG. 2a. The reason for this is that the second arcuate sections 25 which are formed at both sides of the flattened portion 21 extend more steeply in order to maintain the free cross-sectional area with the enlarged flattened portion 21. The same applies accordingly to the third sector 3 as is shown in FIG. 2c. The first arcuate section 34 above the flattened portion 31 has a smaller radius R3 than in FIG. 2b. The second arcuate section 35 has a radius R3.1 at both sides of the flattened portion 31 in the transition to the first arcuate section 34 which is in turn larger than that in FIG. 2b, but also larger than that in FIG. 2a. This is due to the fact that the cross-sectional contour in the region of the sector 3, which is located at a spacing of approximately 75 degrees from the outlet 2, again approaches the arcuate form or an oval due to the reduction in size of the flattened portion 31.

It can thus stated that the contour of the cross-section in the individual sectors 1 to 3 has an increasing flattening with the same area. That is, the flattened portion becomes longer, while at the same time, the flanks of the second sections become steeper from the flattened portion to the first semicircular or arcuate section. This means that the shape of the contour over the individual sectors 1 to 3 varies as with a rubber balloon which is pressed onto a support while maintaining its cross-sectional area.

In FIG. 3, the inlet manifold 100 is shown which has an inlet 102 as well as two outlets 103 and 104, with the outlets 103 and 104 being arranged opposite one another. The respective passage from the inlet 102 to the two outlets 103 and 104 is designated by 105. The inner walls from the inlet 102 to the respective outlet 103 and 104 are each marked by 107. As with FIG. 2, different sectors can again also be recognized, namely the sectors 1, 2, 3 and 4, with the sector 1 already having a cross-section which is similar to an oval. The inlet 102 in contrast has a round cross-section. This means that the flattened portion of the passage already starts in the sector 1. In the region of the sector 2, the flattened portion 111 on the inner side 107 of the passage can clearly be recognized. The arcuate first section 114 opposite the flattened portion 111 can likewise be recognized. The second arcuate sections 115 become all the steeper in the transition from the flattened portion to the first arcuate section 114. That is, is the radius increases, the larger the length of the flattened portion 111 becomes. This is particularly shown in a comparison of the cross-sectional contour of FIG. 3b with that in accordance with FIG. 3c. The radius of the second arcuate section 125 is significantly steeper with respect to the second section 115. That is, it has a significantly smaller radius. This means that the longer the flattened portion is made, the steeper the second section becomes in the transition from the flattened portion to the first arcuate section 124, with the radius of the section 125 being reduced in size with respect to the section 115. In contrast, the radius of the first arcuate or semicircular section 124 has increased with respect to that of the section 114 of FIG. 3b. In this respect, the change in the cross-sectional area of the individual sectors behaves in a similar manner as in the passage in FIG. 2, wherein the manifold has only one inlet and one outlet.

REFERENCE NUMERAL LIST 1 outlet manifold
2 inlet
3 outlet
5 passage
7 inner wall
10 shuttle valve
11 flattened portion
12 slider
12a shut-off member of the slider
14 first arcuate section
15 second arcuate section
21 flattened portion
24 first arcuate section
25 second arcuate section
31 flattened portion
34 first arcuate section
35 second arcuate section
100 inlet manifold
102 inlet
103 outlet
104 outlet
105 passage
107 inner walls
111 flattened portion
114 first arcuate section 115 second arcuate section
124 first arcuate section
125 second arcuate section

The invention claimed is:

1. A gas or liquid conducting valve with a manifold, comprising:
   a manifold body defining a curved passage having a manifold inlet and at least one manifold outlet, the passage changing direction over the length of the passage between the manifold inlet and the manifold outlet, the curved passage having a center of curvature and a radially inward side towards the center of curvature;
   the manifold body having a plurality of sequential sectors in a region where the passage changes direction, the passage having a cross-sectional contour in each of the sectors;
   the cross-sectional contour of the passage merging from almost round or oval near the manifold inlet, through a plurality of cross-sectional contours in the plurality of sequential sectors that are flattened on the radially inward side of the curved passage, to an almost round or oval cross-sectional contour near the manifold outlet;
   wherein in a region of the flattened cross-sectional contours, each cross sectional contour has a plurality of arcuate sections that are continuous with one another and with the flattened section; and
   a gas or liquid conducting valve in fluid communication with the curved passage.

2. A gas or liquid conducting valve with a manifold in accordance with claim 1, wherein:
   each of the flattened cross-sectional contours has a flattened portion and a first arcuate portion opposite the flattened portion, the first arcuate portion having a radius that is proportional to the length of the respective flattened portion.

3. A gas or liquid conducting valve with a manifold in accordance with claim 2, wherein:
   each of the flattened cross-sectional contours further has two second arcuate portions interconnecting the flattened portion and first arcuate portion; and
   the second arcuate portions have a radius that is inversely proportional to the length of the respective flattened portion.

4. A gas or liquid conducting valve with a manifold in accordance with claim 1, wherein:
   the cross-sectional area of the passage is substantially the same throughout the length of the passage.

5. A gas or liquid conducting valve with a manifold in accordance with claim 1, wherein:
   the change in direction of the passage between the manifold inlet and the manifold outlet is in the range of 60 to 90 degrees.

6. A gas or liquid conducting valve with a manifold in accordance with claim 5, wherein:
   the change in direction is approximately 75 degrees.

7. A gas or liquid conducting valve with a manifold in accordance with claim 1, wherein:
   the manifold is an inlet manifold with two mutually opposite outlets; and
   the change in direction of the passage between the manifold inlet and the manifold outlets is approximately 90 degrees.

8. A as or liquid conducting valve with a manifold shuttle valve in accordance with claim 1, wherein:
   the valve is a shuttle valve having a slider.

9. A gas or liquid conducting valve with a manifold, comprising:
   a gas or liquid conducting valve;
   an inlet manifold and an outlet manifold both in fluid communication with the valve, the outlet manifold defining a curved passage having a manifold inlet and at least one manifold outlet, the passage changing direction over the length of the passage between the manifold inlet and the manifold outlet, the curved passage having a center of curvature and a radially inward side towards the center of curvature;
   the outlet manifold having a plurality of sequential sectors in a region where the passage changes direction, the passage having a cross-sectional contour in each of the sectors;
   the cross-sectional contour of the passage merging from almost round or oval near the manifold inlet, through a plurality of cross-sectional contours in the plurality of sequential sectors that are flattened on the radially inward side of the curved passage, to an almost round or oval cross-sectional contour near the manifold outlet;
   wherein in a region of the flattened cross-sectional contours, each cross sectional contour has a plurality of arcuate sections that are continuous with one another and with the flattened section.

10. A gas or liquid conducting valve with a manifold in accordance with claim 9, further comprising:
    a second outlet manifold in fluid communication with the valve, the second outlet manifold defining a curved passage having a manifold inlet and at least one manifold outlet, the passage changing direction over the length of the passage between the manifold inlet and the manifold outlet, the curved passage having a center of curvature and a radially inward side towards the center of curvature;
    the second outlet manifold having a plurality of sequential sectors in a region where the passage changes direction, the passage having a cross-sectional contour in each of the sectors;
    the cross-sectional contour of the passage merging from almost round or oval near the manifold inlet, through a plurality of cross-sectional contours in the plurality of sequential sectors that are flattened on the radially inward side of the curved passage, to an almost round or oval cross-sectional contour near the manifold outlet;
    wherein in a region of the flattened cross-sectional contours, each cross sectional contour has a plurality of arcuate sections that are continuous with one another and with the flattened section.

11. A gas or liquid conducting valve with a manifold in accordance with claim 10, wherein:
    the cross-sectional area of the passage of each of the outlet manifold and the second outlet manifold is substantially the same throughout the length of the passage.

12. A gas or liquid conducting valve with a manifold in accordance with claim 9, wherein:
    the cross-sectional area of the passage is substantially the same throughout the length of the passage.

* * * * *